2 Sheets—Sheet 1.

S. FRENCH,

Assignor, by mesne assignments, to THE GOLD MEDAL SEWING MACHINE COMPANY.

Sewing Machine.

Re No. 9,450. Reissued Nov. 9, 1880.

Witnesses.

Arthur Reynolds

Laurence E. Connor

Inventor.

Stephen French.

by Crosby & Gregory Attys

N. PETERS, PHOTO-LITHOGRAPHER, WASHINGTON, D. C.

2 Sheets—Sheet 2.

S. FRENCH,

Assignor, by mesne assignments, to THE GOLD MEDAL SEWING MACHINE COMPANY.

Sewing Machine.

No. 9,450. Reissued Nov. 9, 1880.

Witnesses.

Arthur Reynolds
Laurence F. Connor.

Inventor.

Stephen French
by Crosby & Gregory Attys

N. PETERS, PHOTO-LITHOGRAPHER, WASHINGTON, D. C.

UNITED STATES PATENT OFFICE.

STEPHEN FRENCH, OF ORANGE, MASS., ASSIGNOR, BY MESNE ASSIGNMENTS, TO THE GOLD MEDAL SEWING MACHINE COMPANY, OF SAME PLACE.

SEWING-MACHINE.

SPECIFICATION forming part of Reissued Letters Patent No. 9,450, dated November 9, 1880.

Original No. 80,345, dated July 28, 1868. Application for reissue filed August 7, 1880.

*To all whom it may concern:*

Be it known that I, STEPHEN FRENCH, of Orange, in the county of Franklin and State of Massachusetts, have invented a new and Improved Sewing-Machine; and I do hereby declare that the following is a full, clear, and exact description of the invention, which will enable others skilled in the art to make and use the same, reference being had to the accompanying drawings, forming part of this specification.

Figure 1:
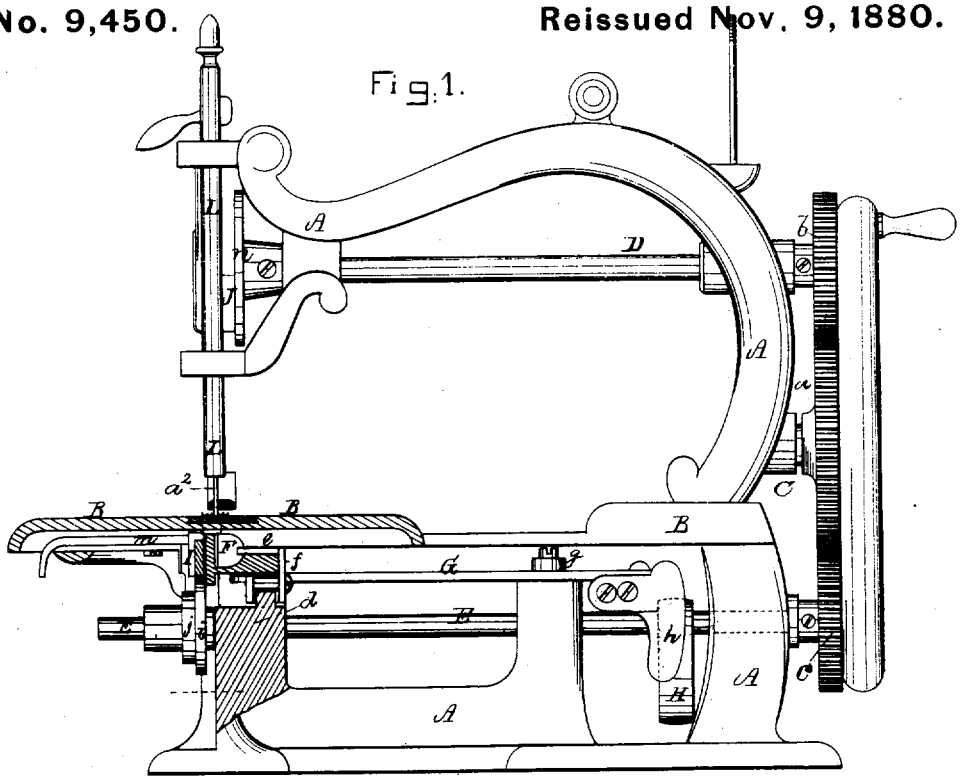
Figure 3:
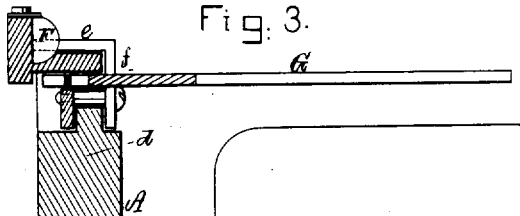
Figure 2:
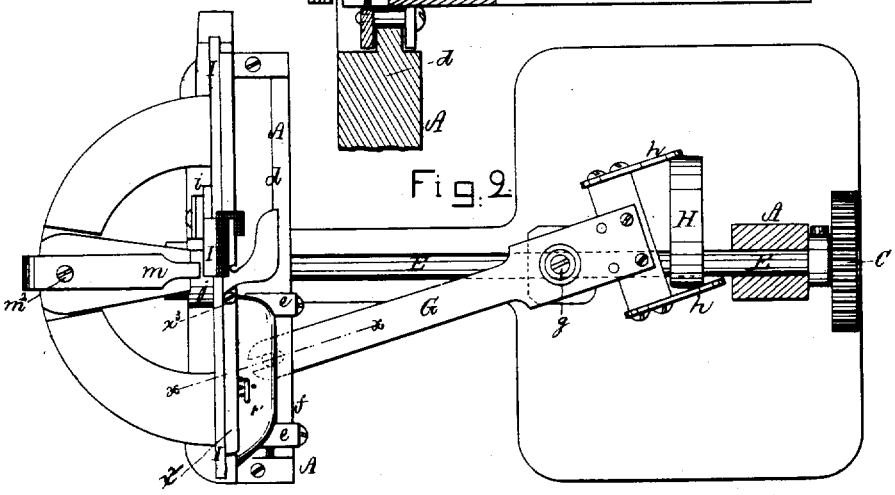
Figure 4:
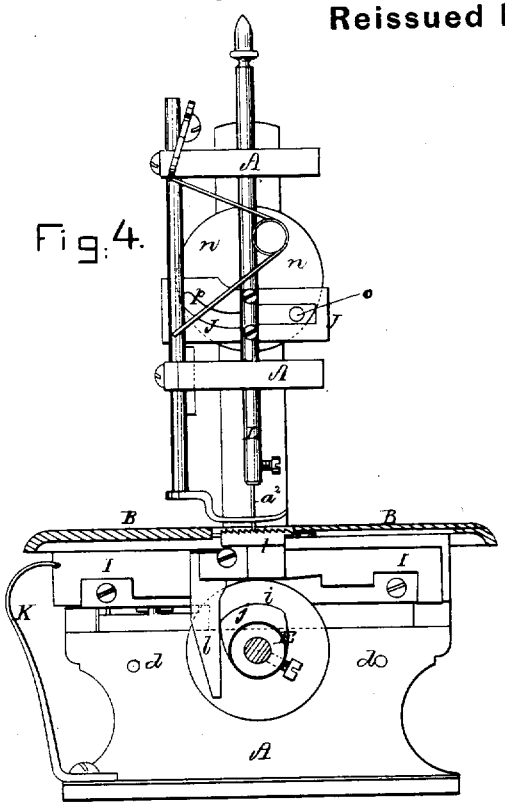
Figure 5:
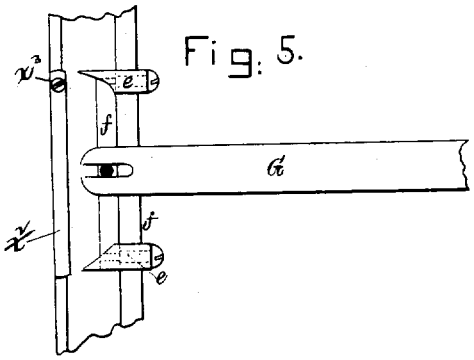

Figure 1 represents a side elevation, partly in section, of my improved sewing-machine; Fig. 2, a horizontal section of the same; Fig. 3, a detail sectional view of the same, taken on the plane of the line *x x*, Fig. 2; Fig. 4, a front elevation of the sewing-machine shown in Fig. 1, partly in section; and Fig. 5, a detail plan or top view of the lever by which the shuttle is moved.

Similar letters of reference indicate corresponding parts.

This invention relates to sewing-machines; and it consists, essentially, in the combination, in a sewing-machine of the shuttle class, of a horizontal rotating shaft, a cam or eccentric thereon, and a shuttle-moving lever mounted or located to vibrate horizontally about a pivot or center at right angles to the axis of the said shaft, the said cam or eccentric serving to vibrate the said lever, while the latter imparts motion to the shuttle.

In the drawings, A represents the rigid frame-work of the machine, and B the cloth-supporting bed or table. The toothed wheel *a*, mounted on the stud C, meshes into two pinions, *b* and *c*, of which one is above and the other below it, as shown. The upper pinion, *b*, is secured at the rear end of the horizontal shaft D, it imparting motion to the needle-bar and needle, as will be hereinafter more fully described. The pinion *c* is attached to the end of the horizontal rotating shaft E.

On the upright portion *d* of the lower frame-work, A, is arranged the raceway for the reciprocating shuttle F, as shown in Figs. 2 and 3. The shuttle is held between two arms, *e e*, of a shuttle-driver, *f*, sliding on the rear corner of the said portion *d* of the frame A. The driver *f* receives its motion from a horizontally vibrating or oscillating shuttle-moving lever, G, with the front end of which it is connected in usual manner. This lever G is mounted upon a pin or center, *g*, placed substantially at right angles to the axis or center of the rotating shaft E. This shuttle-moving lever G has near its rear end two wings, *h h*, that embrace or fit the rounded or convexed periphery of the cam or eccentric H, fixed on the shaft E. The shuttle-moving devices so constructed and operated are very simple and cannot easily get out of order.

In front of the upright portion *d* of the frame A the shaft E has two cams, *i* and *j*, of which one serves to impart up and the other forward motion to the feed-bar I. The feed-bar I, provided with the lug *l*, is placed loosely in suitable guides at the front of the upright part *d*. The main part of the feed-bar always rests upon the cam *i* that raises it, and does not break its contact with the said cam as the feed-bar is lowered and forced backward by the spring K, connected with one end thereof. The lug *l* is struck and moved by the cam *j* to move the feed-bar forward after it is raised by the cam *i* to engage the cloth.

The length of feed and stitch is regulated by the stop *m*, pivoted at $m^2$, it arresting the backward movement of the feed-bar by the spring K, so as to permit the cam *j* to act for more or less of its throw on the said lug, as usual.

The eye-pointed needle $a^2$ and shuttle F in construction are as usual. The shuttle is kept down in the race by the latch $x^2$, pivoted at $x^3$ upon the face of the shuttle-race.

On the front end of the shaft D is mounted a disk, *n*, from the face of which projects an eccentric-pin. This pin enters the slotted plate J, attached to and forming part of the needle-bar L. The slot in the plate J is horizontal for part of its length and then bent upward at one end. As the shaft D is revolved the pin *o* will carry the plate J up and down with it, and when the needle is quite down will be at the middle of the slot, it not then moving the plate, at least not perceptibly; but as the pin *o* reaches the highest end, *p*, of the slot in the plate J the needle-bar is quickly raised and lowered. This slot, shaped as described, enables the needle-bar to be held down while the shuttle passes through the loop of the needle-thread. The upward bend *p* of the slot is therefore of great importance.

The rounded or convexed face of the cam H insures a more extended contact of the wings *h* with the cam-face and results in a more uniform motion.

By placing the shuttle-moving lever G on or to turn about a vertical pivot or center of motion I am enabled, by a cam or eccentric on a horizontal shaft at right angles to the center of motion of the said lever, to move it positively in both directions of its vibrations.

I am aware, in that class of machines of which the "Domestic" is a sample, that an eccentric on a horizontal shaft is arranged between the forked end of a vertical lever made to vibrate by the said cam about a pivot or center parallel with the said rotating shaft; but in such class of machine a second independent vibrating lever below the cloth-plate is rendered necessary to move the shuttle.

The chief aim and object of my invention is to simplify the construction of the sewing mechanism and do away with the grooved hub-cam and vibrating elbow-lever and roller-stud common to the Howe machine.

It will be noticed in my machine that the center about which the shuttle-lever turns is pointed directly toward the shaft carrying the eccentric for vibrating the shuttle-actuating lever, such construction enabling me not only to reduce the strain of the parts to the minimum, but also to employ an eccentric within the forked end of the shuttle-actuating lever, which would not be practicable were the center of the shuttle-actuating lever placed at one side of the line of the rotating shaft, as in the Howe machine.

I claim—

1. In a sewing-machine having an eye-pointed needle and shuttle, the horizontal rotating shaft E and eccentric thereon, combined with a vibrating lever forked at its rear end and directly actuated at that end by the said eccentric to move the shuttle, the said lever being mounted to turn on a pivot or center at right angles to and in the line of the axis of the said rotating shaft, substantially as described.

2. In a sewing-machine of the shuttle variety, the rotating shaft E and its cam or eccentric, provided with a rounded or convexed face or periphery, combined with a shuttle-moving lever and wings or projections to bear upon the rounded face of the said cam at each side of the shaft carrying it, to thus insure a positive and easy movement of the shuttle-moving lever, as set forth.

STEPHEN FRENCH.

Witnesses:

ABIJAH FRENCH,

A. H. BATES.